(12) United States Patent
Ehsani et al.

(10) Patent No.: US 10,552,533 B2
(45) Date of Patent: Feb. 4, 2020

(54) PHRASE-BASED DIALOGUE MODELING WITH PARTICULAR APPLICATION TO CREATING RECOGNITION GRAMMARS FOR VOICE-CONTROLLED USER INTERFACES

(71) Applicant: NANT HOLDINGS IP, LLC, Culver City, CA (US)

(72) Inventors: Farzad Ehsani, Sunnyvale, CA (US); Eva M. Knodt, La Honda, CA (US)

(73) Assignee: NANT HOLDINGS IP, LLC, Culver City, CA (US)

( * ) Notice: Subject to any disclaimer, the term of this patent is extended or adjusted under 35 U.S.C. 154(b) by 0 days.

(21) Appl. No.: 14/974,271

(22) Filed: Dec. 18, 2015

(65) Prior Publication Data
US 2016/0104481 A1 Apr. 14, 2016

Related U.S. Application Data

(60) Continuation of application No. 14/178,259, filed on Feb. 11, 2014, now Pat. No. 9,251,138, which is a
(Continued)

(51) Int. Cl.
*G10L 15/197* (2013.01)
*G10L 15/00* (2013.01)
(Continued)

(52) U.S. Cl.
CPC .......... *G06F 17/271* (2013.01); *G06F 17/279* (2013.01); *G06F 17/2715* (2013.01);
(Continued)

(58) Field of Classification Search
CPC ... G10L 15/265; G10L 15/183; G10L 15/197; G10L 15/00; G10L 15/22; G10L 15/005; G10L 15/193; G06F 17/271; G06F 17/2715; G06F 17/279; G06F 17/2795; G06F 17/2775; G06F 17/2765
See application file for complete search history.

(56) References Cited

U.S. PATENT DOCUMENTS 5,020,021 A    5/1991   Kaji et al.
5,086,385 A *  2/1992   Launey ............... G06F 3/04847
                                                    340/6.11
(Continued)

OTHER PUBLICATIONS

Papineni, K.A., et al., "Maximum Likelihood and Discriminative Training of Direct Translation Models," IEEE International Conference on Acoustics, Speech and Signal Processing, vol. 1, May 1998, pp. 189-192.
(Continued)

*Primary Examiner* — Angela A Armstrong
(74) *Attorney, Agent, or Firm* — Stetina Brunda Garred and Brucker

(57) ABSTRACT

The invention enables creation of grammar networks that can regulate, control, and define the content and scope of human-machine interaction in natural language voice user interfaces (NLVUI). More specifically, the invention concerns a phrase-based modeling of generic structures of verbal interaction and use of these models for the purpose of automating part of the design of such grammar networks.

22 Claims, 4 Drawing Sheets

Related U.S. Application Data continuation of application No. 13/736,689, filed on Jan. 8, 2013, now Pat. No. 8,650,026, which is a division of application No. 10/096,194, filed on Mar. 11, 2002, now Pat. No. 8,374,871, which is a continuation of application No. 09/580,059, filed on May 27, 2000, now abandoned.

(60) Provisional application No. 60/136,970, filed on May 28, 1999.

(51) Int. Cl.
  *G10L 15/22*  (2006.01)
  *G06F 17/27*  (2006.01)
  *G10L 15/193*  (2013.01)
  *G10L 15/183*  (2013.01)

(52) U.S. Cl.
  CPC ...... *G06F 17/2765* (2013.01); *G06F 17/2775* (2013.01); *G06F 17/2795* (2013.01); *G10L 15/005* (2013.01); *G10L 15/193* (2013.01); *G10L 15/197* (2013.01); *G10L 15/22* (2013.01); *G10L 15/183* (2013.01)

(56) References Cited

U.S. PATENT DOCUMENTS

| | | | |
|---|---|---|---|
| 5,131,045 A | 7/1992 | Roth | |
| 5,278,980 A | 1/1994 | Pedersen et al. | |
| 5,452,397 A | 9/1995 | Ittycheriah et al. | |
| 5,457,768 A | 10/1995 | Tsuboi et al. | |
| 5,475,587 A * | 12/1995 | Anick | G06F 17/274 |
| | | | 704/4 |
| 5,497,319 A | 3/1996 | Chong et al. | |
| 5,577,165 A | 11/1996 | Takebayashi et al. | |
| 5,615,296 A | 3/1997 | Stanford et al. | |
| 5,640,488 A | 6/1997 | Junqua et al. | |
| 5,675,819 A * | 10/1997 | Schuetze | G06F 17/274 |
| | | | 704/10 |
| 5,680,511 A | 10/1997 | Baker et al. | |
| 5,694,558 A | 12/1997 | Sparks et al. | |
| 5,787,395 A | 7/1998 | Minamino | |
| 5,797,123 A | 8/1998 | Chou et al. | |
| 5,799,268 A | 8/1998 | Boguraev | |
| 5,819,220 A | 10/1998 | Sarukkai et al. | |
| 5,828,991 A | 10/1998 | Skiena et al. | |
| 5,870,706 A | 2/1999 | Alshawi | |
| 5,883,986 A | 3/1999 | Kopec et al. | |
| 5,960,384 A | 9/1999 | Brash | |
| 5,963,940 A | 10/1999 | Liddy et al. | |
| 5,963,965 A * | 10/1999 | Vogel | G06F 17/30696 |
| | | | 707/999.003 |
| 5,991,712 A | 11/1999 | Martin | |
| 5,995,918 A | 11/1999 | Kendall et al. | |
| 6,006,221 A | 12/1999 | Liddy et al. | |
| 6,044,337 A | 3/2000 | Gorin et al. | |
| 6,138,098 A * | 10/2000 | Shieber | G06F 17/271 |
| | | | 704/257 |
| 6,154,722 A | 11/2000 | Bellegarde | |
| 6,163,768 A | 12/2000 | Sherwood et al. | |
| 6,173,261 B1 | 1/2001 | Arai et al. | |
| 6,175,830 B1 | 1/2001 | Maynard | |
| 6,415,250 B1 | 7/2002 | van den Akker | |
| 6,456,972 B1 | 9/2002 | Gladstein et al. | |
| 6,499,013 B1 | 12/2002 | Weber | |
| 6,556,973 B1 | 4/2003 | Lewin | |
| 6,636,831 B1 | 10/2003 | Pofit, Jr. et al. | |
| 2002/0169604 A1 | 11/2002 | Damiba et al. | |
| 2002/0169613 A1 | 11/2002 | Damiba | |

OTHER PUBLICATIONS

Croft, W. Bruce, et al., "The Use Of Phrases and Structured Queries in Information Retrieval," 14th Annual International ACM SIGIR Conference on Research and Development in Information Retrieval, Sep. 1991, pp. 32-45.

Gelbukh, Alexander, et al., "Coherence Maintenance in Human-Machine Dialogue: Indirect Antecedents and Ellipses," 11th International Workshop on Database and Expert Systems Applications, Sep. 2000, pp. 96-100.

Dias, Gael, et al., "Does Natural Selection Apply to Natural Language Processing? An Experiment for Multiword Unit Extraction," IEEE International Conference on Systems, Man and Cybernetics, vol. 1, Oct. 2001, pp. 205-212.

Lopez-Lopez, Aurelio, et al., "Evidence Accumulation with Competition in Information Retrieval," String Processing and Information Retrieval: A South American Symposium, Sep. 1998, pp. 41-49.

Kawahara, Tatsuya, et al., "Key-Phrase Detection and Verification for Flexible Speech Understanding," IEEE International Conference on Spoken Language, vol. 2, Oct. 1996, pp. 861-864.

Ehsani, Farzad et al,, "Speech Technology in Computer-Aided Language Learning: Strengths and Limitations of a New Call Paradigm," Language, Leaning and Technology, vol. 2, No. 1, Jul. 1998, pp. 45-60.

* cited by examiner

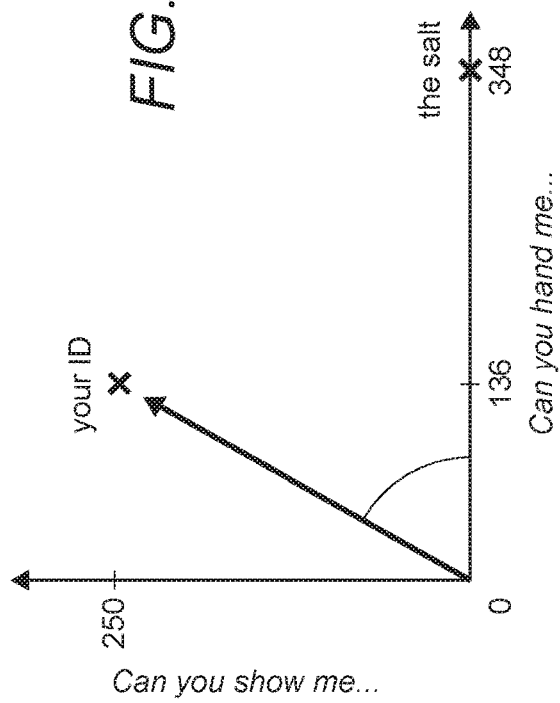

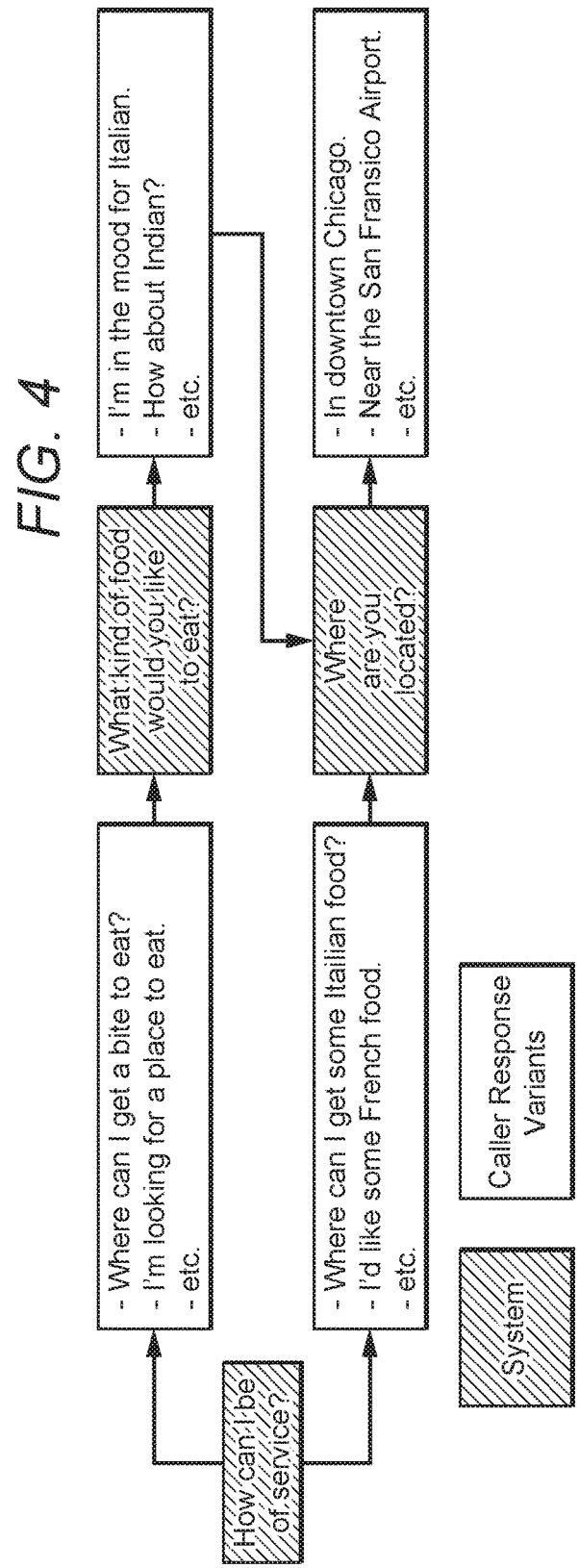

$$\begin{Bmatrix} C(1) & C(2) & \cdots & C(N-2) \\ \vdots & \vdots & \cdots & \vdots \\ \cdots & Unew & \cdots & \cdots \\ \vdots & \vdots & \cdots & \vdots \end{Bmatrix} \cdot \begin{Bmatrix} S1 & & & \\ & S2 & & \\ & & \cdots & \\ & & & Sn-2 \end{Bmatrix} \cdot \begin{Bmatrix} C(1) & C(2) & \cdots & C(N-2) \\ \vdots & \vdots & \cdots & \vdots \\ \cdots & Vnew & \cdots & \cdots \\ \vdots & \vdots & \cdots & \vdots \end{Bmatrix} = \begin{Bmatrix} C(1) & C(2) & \cdots & C(N-2) \\ \vdots & \vdots & \cdots & \vdots \\ \cdots & Anew & \cdots & \cdots \\ \vdots & \vdots & \cdots & \vdots \end{Bmatrix}$$

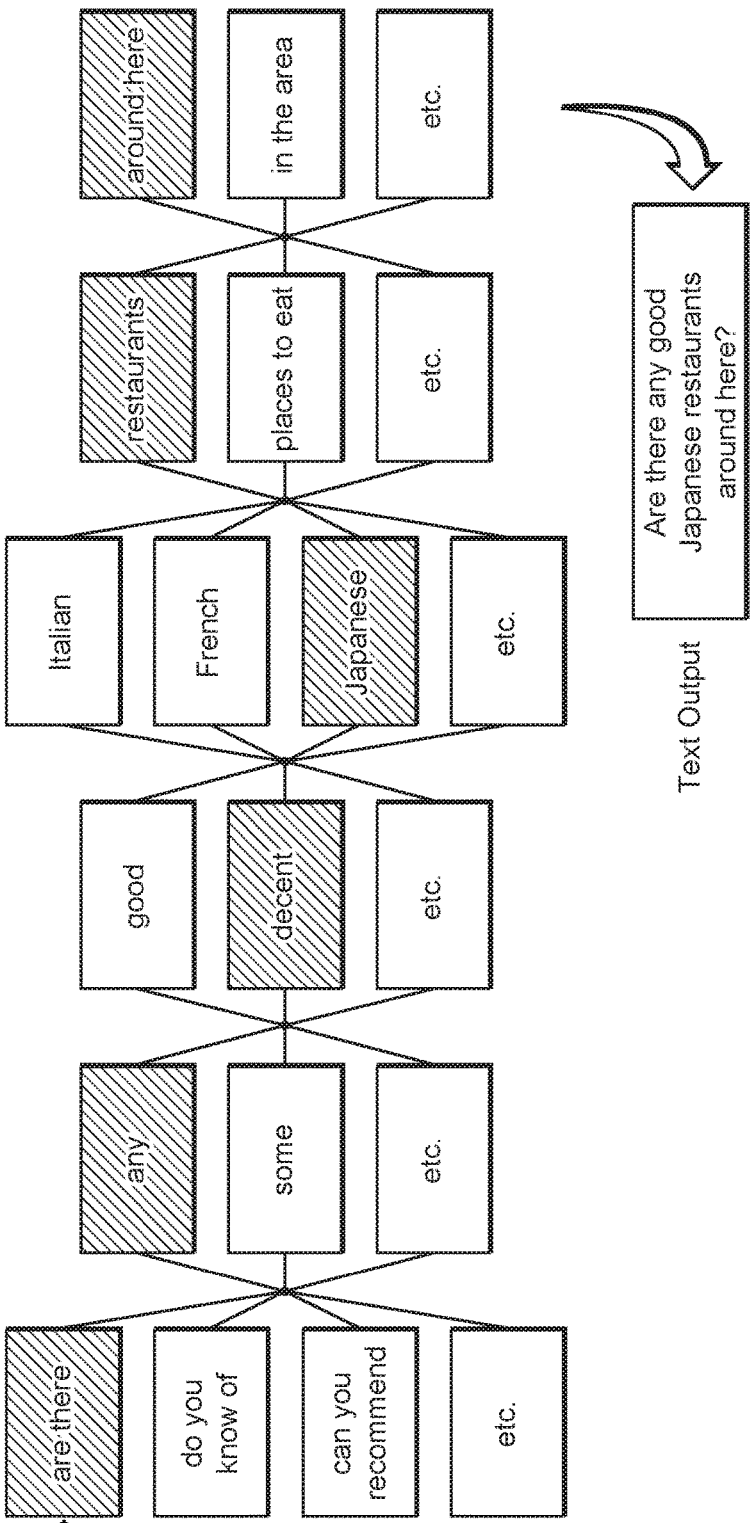

PHRASE-BASED DIALOGUE MODELING WITH PARTICULAR APPLICATION TO CREATING RECOGNITION GRAMMARS FOR VOICE-CONTROLLED USER INTERFACES

1. This application is a continuation of U.S. application Ser. No. 14/178,259 filed Feb. 11, 2014, which is a continuation of U.S. application Ser. No. 13/736,689 filed Jan. 8, 2013 and issued on Feb. 11, 2014 as U.S. Pat. No. 8,650,026, which is a divisional of U.S. application Ser. No. 10/096,194, filed Mar. 11, 2002 and issued Feb. 12, 2013 as U.S. Pat. No. 8,374,871, which is a continuation of U.S. application Ser. No. 09/580,059, filed May 27, 2000, which claims the benefit of U.S. Application Ser. No. 60/136,970, filed May 28, 1999, all of which are incorporated herein by reference in their entirety.

BACKGROUND OF THE INVENTION

1. Field of the Invention

This invention relates to the creation of grammar networks that regulate, control, and define the content and scope of human-machine interaction in natural language voice user interfaces (NLVUI). More specifically, the invention concerns a phrase-based modeling of generic structures of verbal interaction and use of these models for the purpose of automating part of the design of such grammar networks.

2. Related Art

In recent years, a number of routine over-the-phone transactions such as voice dialing and collect call handling, as well as some commercial call center self-service applications, have been successfully automated with speech recognition technology. Such systems allow users to access e.g., a banking application or ticket reservation system, remotely, and to retrieve information or complete simple transactions by using voice commands.

a. Limitations and Unsolved Problems in Current Technology

Current technology limits the design of spoken dialogue systems in terms of both complexity and portability. Systems must be designed for a clearly defined task domain, and users are expected to respond to system prompts with short, fixed voice commands. Systems typically work well as long as vocabularies remain relatively small (200-500 words), choices at any point in the interaction remain limited and users interact with the system in a constrained, disciplined manner.

There are two major technological barriers that need to be overcome in order to create systems that allow for more spontaneous user interaction: (1) systems must be able to handle more complex tasks, and (2) the speech interface must become more "natural" if systems are expected to perform sophisticated functions based on unrestrained, natural speech or language input.

A major bottleneck is the complexity of the grammar network that enables the system to recognize natural language voice requests, interpret their meaning correctly, and respond appropriately. As indicated above, this network must anticipate, and thus explicitly spell out, the entire virtual space of possible user requests and/or responses to any given system prompt. To keep choices limited, the underlying recognition grammars typically process requests in a strictly predetermined, menu-driven order.

Another problem is portability. Current systems must be task specific, that is, they must be designed for a particular domain. An automated banking application cannot process requests about the weather, and, conversely, a system designed to provide weather information cannot complete banking transactions. Because recognition grammars are designed by hand and model domain specific rather than generic machine-human interaction, they cannot be easily modified or ported to another domain. Reusability is limited to certain routines that may be used in more than one system. Such routines consist of sub-grammars for yes-no questions or personal user data collection required in many commercial transactions (e.g., for collecting name, addresses, credit card information etc.). Usually, designing a system in a new domain means starting entirely from scratch.

Even though the need for generic dialogue models is widely recognized and a number of systems claim to be portable, no effective and commercially feasible technology for modeling generic aspects of conversational dialogue currently exists.

b. Current System Design and Implementation

The generated dialogue flow and the grammar network can be dauntingly complex for longer interactions. The reason is that users always manage to come up with new and unexpected ways to make even the simplest request, and all potential input variants must be anticipated in the recognition grammar. Designing such recognition grammars, usually by trained linguists, is extremely labor-intensive and costly. It typically starts with a designer's guess of what users might say and requires hours of refinement as field data is collected from real users interacting with a system simulation or a prototype.

c. Stochastic Versus Rule-Based Approaches to Natural Language Processing

Since its beginnings, speech technology has oscillated between rule-governed approaches based on human expert knowledge and those based on statistical analysis of vast amounts of data. In the realm of acoustic modeling for speech recognition, probabilistic approaches have far outperformed models based on expert knowledge. In natural language processing (NLP), on the other hand, the rule-governed, theory-driven approach continued to dominate the field throughout the 1970's and 1980's.

In recent years, the increasing availability of large electronic text corpora has led to a revival of quantitative, computational approaches to NLP in certain domains.

One such domain is large vocabulary dictation. Because dictation covers a much larger domain than interactive voice-command systems (typically a 30,000 to 50,000 word vocabulary) and does not require an interpretation of the input, these systems deploy a language model rather than a recognition grammar to constrain the recognition hypotheses generated by the signal analyzer. A language model is computationally derived from large text corpora in the target domain (e. g., news text). N-gram language models contain statistical information about recurrent word sequences (word pairs, combinations of 3, 4, or n words). They estimate the likelihood that a given word is followed by another word, thus reducing the level of uncertainty in automatic speech recognition. For example, the word sequence "A bear attacked him" will have a higher probability in Standard English usage than the sequence "A bare attacked him."

Another domain where probabilistic models are beginning to be used is automated part-of-speech analysis. Part-of-speech analysis is necessary in interactive systems that require interpretation, that is, a conceptual representation of a given natural language input. Traditional part-of-speech analysis draws on explicit syntactical rules to parse natural language input by determining the parts of an utterance and the syntactic relationships among these parts. For example, the syntactical rule S→NP VP states that a sentence S consists of a noun phrase NP and a verb phrase VP.

Rule-based parsing methods perform poorly when confronted with syntactically ambiguous input that allows for more than one possible syntactic representation. In such cases, linguistic preferences captured by probabilistic models have been found to resolve a significant portion of syntactic ambiguity.

Statistical methods have also been applied to modeling larger discourse units, such as fixed phrases and collocations (words that tend to occur next to each other, e.g. "eager to please"). Statistical phrase modeling involves techniques similar to the ones used in standard n-gram language modeling, namely, collecting frequency statistics about word sequences in large text corpora (n-grams). However, not every n-gram is a valid phrase, for example, the sequence "the court went into" is a valid 4-gram in language modeling, but only "the court went into recess" is a phrase. A number of different methods have been used to derive valid phrases from n-grams, including syntactical filtering, mutual information, and entropy. In some cases, statistical modeling of phrase sequences has been found to reduce lexical ambiguity. Others have used a phrase-based statistical modeling technique to generate knowledge bases that can help lexicographers to determine relevant linguistic usage.

Experiments in training probabilistic models of higher-level discourse units on conversational corpora have also been shown to significantly reduce the perplexity of a large-vocabulary continuous speech recognition task in the domain of spontaneous conversational speech. Others have modeled dialogue flow by using a hand-tagged corpus in which each utterance is labeled as an IFT (illocutionary force type). Probabilistic techniques have also been used to build predictive models of dialogue structures such as dialogue act sequences. The bottleneck in all of these experiments is the need for hand-tagging both training and testing corpora.

Another recent application of a probabilistic, phrase-based approach to NLP has been in the field of foreign language pedagogy, where it has been proposed as a new method of teaching foreign languages. Michael Lewis, in his book, *Implementing The Lexical Approach* (Howe, Engl, 1997) challenges the conventional view that learning a language involves two separate cognitive tasks: first, learning the vocabulary of the language, and second, mastering the grammatical rules for combining words into sentences. The lexical approach proposes instead that mastering a language involves knowing how to use and combine phrases in the right way (which may or may not be grammatical). Phrases, in Lewis's sense are fixed multi-word chunks of language, whose likelihood of co-occurring in natural text is more than random. Mastering a language is the ability of using these chunks in a manner that produces coherent discourse without necessarily being rule-based.

SUMMARY OF THE INVENTION

In one aspect, the present invention concerns modeling generic aspects of interactive discourse based on statistical modeling of phrases in large amounts of conversational text data. It involves automatically extracting valid phrases from a given text corpus, and clustering these phrases into syntactically and/or semantically meaningful equivalent classes. Various existing statistical and computational techniques are combined in a new way to accomplish this end. The result is a large thesaurus of fixed word combinations and phrases. To the extent that this phrase thesaurus groups similar or semantically equivalent phrases into classes along with probabilities of their occurrence, it contains an implicit probabilistic model of generic structures found in interactive discourse, and thus can be used to model interactions across a large variety of different contexts, domains, and languages.

In another form of the present invention, this thesaurus provides a data structure in which variations of saying the same thing and their associated probabilities can be looked up quickly. It forms the key element of an application that supports the rapid prototyping of complex recognition grammars for voice-interactive dialogue systems.

The present invention has a number of significant advantages over existing techniques for designing voice recognition grammars. Most significantly, it automates the most laborious aspects of recognition grammar design, namely, the need to generate, either by anticipation or by empirical sampling, potential variants of responses to any given system prompt. Secondly, it eliminates the need for expensive user data collection and hand coding of recognition grammars. Thirdly, the invention allows developers without specialized linguistic knowledge to design much more complex networks than conventional design techniques can support. In sum, the invention enables a developer to create more complex and better performing systems in less time and with fewer resources.

In another aspect of the invention, a compiled thesaurus (containing only the phrases incorporated into any given recognition grammar) is incorporated into a natural language understanding (NLU) component that parses the recognizer output at run-time to derive a conceptual meaning representation. Because phrases consist of words in context, they are potentially less ambiguous than isolated words. Because a phrase-based parser can draw on the linguistic knowledge stored in a large probabilistic phrase thesaurus, it is able to parse utterances much faster and with higher accuracy than conventional rule-based parsers.

BRIEF DESCRIPTION OF THE DRAWINGS

FIG. 1 illustrates a two-dimensional vector space for the phrases "can you show me . . . " and "can you hand me . . . ."

FIG. 2 illustrates a matrix representation of a singular value decomposition algorithm.

FIG. 3 illustrates a simplified matrix representation of a singular value decomposition algorithm.

FIG. 4 is an example of a dialogue flow chart for a simple restaurant information request.

FIG. 5 shows a type of network recognition grammar for user responses to the system prompt: "What kind of food would you like to eat?".

DETAILED DESCRIPTION OF THE INVENTION

1. Phrase-Based Dialogue Modeling

Figure 6:
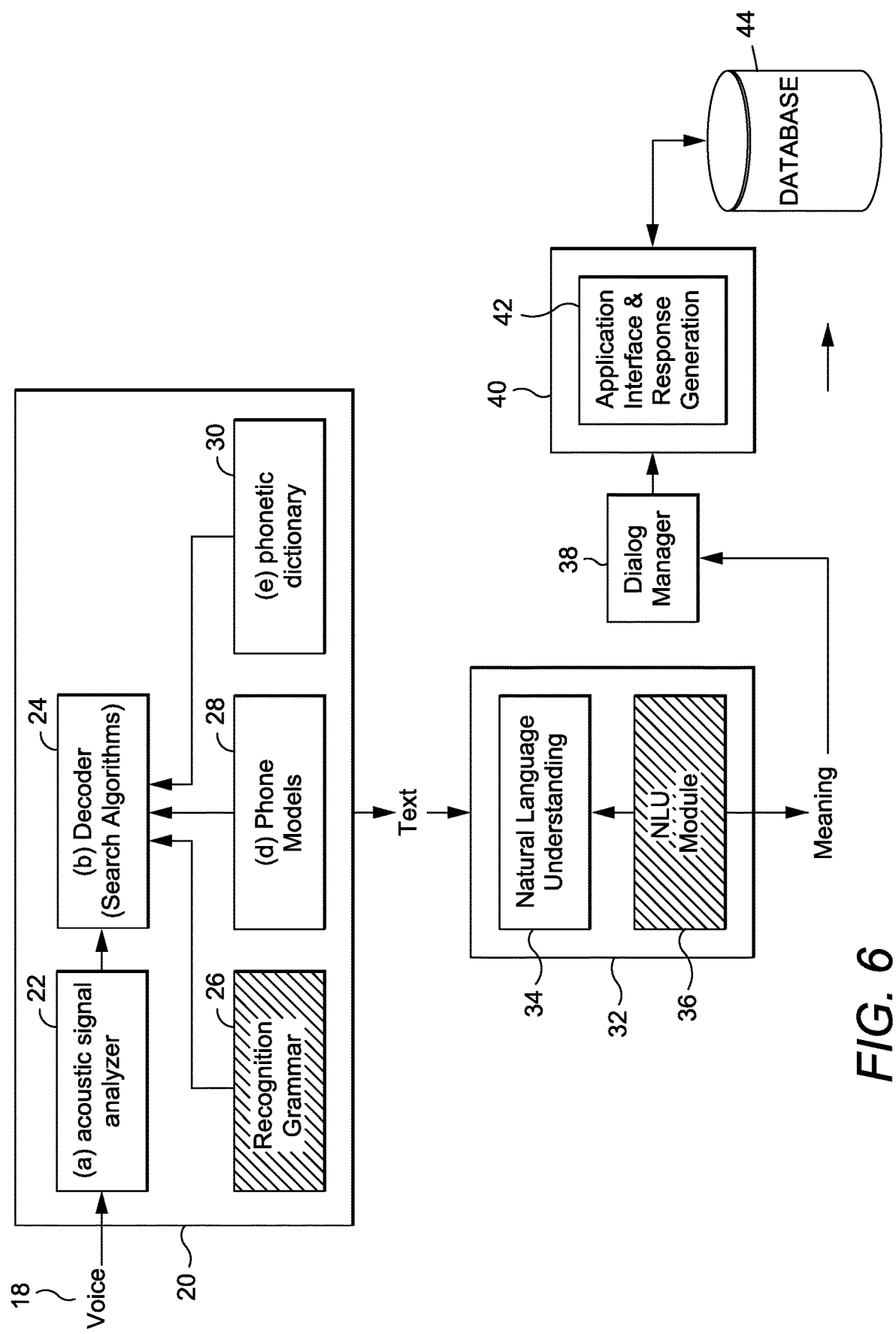
FIG. 6 illustrates the place of the present invention within an application that is controlled by a voice-interactive natural language user interface.

The present invention can enable a person with no special linguistic expertise to design a dialogue flow for an interactive voice application. It can be used to automatically generate a recognition grammar from information specified in a dialogue flow design. The key element in the present invention is a large, machine-readable database containing phrases and other linguistic and statistical information about dialogue structures. This database provides the linguistic knowledge necessary to automatically expand a call-flow design into a recognition grammar. The following is a description of the components of the invention, how they are generated and how they work together within the overall system.

a. Phrase Thesaurus

The phrase thesaurus is a large database of fixed word combinations in which alternative ways of saying the same thing can be looked up. The phrases are arranged in the order of frequency of occurrence, and they are grouped in classes that contain similar or semantically equivalent phrases. The following is an example of a class containing interchangeable ways of confirming that a previous utterance by another speaker has been understood:

I understand
 I hear you
 [I] got [you:your point:it]
 I see your point
 I [hear:see: know:understand] [what you're saying:what you mean]
 I follow you
 [I'm:I am] with you [there]
 I [hear:read] you loud and clear (Example based on Michael Lewis, *Implementing the Lexical Approach: Putting Theory into Practice*, Howe, Engl., 1997.)

The database comprises anywhere from 500,000 and 1 million phrase entries, plus a vocabulary of lexical items containing objects, locations, proper names, dates, times etc. that are used to fill the slots in phrase templates such as "how do I get to . . . ?". Some partial phrases may occur in several different groupings. For example, the sub-phrase "I know" in "I know what you mean" may also occur in another class containing alternate ways of challenging a speaker:

[I know:I'm sure:I believe] you're [wrong: mistaken]

As a result, some phrase classes may be overlapping or contain cross-references between partial phrases.

b. Building a Phrase Thesaurus

The phrase thesaurus is generated automatically by a series of computer programs that operate on large amounts of natural language text data. The programs are executed sequentially and in a fixed order, each taking the output of the previous program as its input, and processing it further. Taken together, the programs take a large text corpus as their input, and output a phrase thesaurus of the type described in section a. above. Some of the steps involved in this process are based on standard algorithms that have been used in various aspects of computational linguistics to process large machine readable corpora. These algorithms are used and combined within the present invention in a new way to accomplish the goal of automatically deriving a phrase thesaurus.

c. Linguistic Assumptions Underlying the Invention

The present invention makes the following linguistic assumptions:

1. Language in general, and conversational speech in particular, consists of phrases rather than of isolated vocabulary items, the combination of which is governed by grammatical rules.
2. A phrase is a fixed, multi-word chunk of language of an average length between 1 and 7 words that conveys a unique idiomatic sense depending on just that particular combination of words. The words that make up a phrase may or may not occur next to each other (e.g., the phrase "to make sense" can be separated by "a whole lot of," "not much," etc.).
3. The use of phrases is governed by conventions of usage and linguistic preferences that are not always explicable with reference to grammatical rules. The phrase "on the one hand" loses its unique phrasal sense if "hand" is replaced by "finger." "On the one finger" is not a legitimate phrase in Standard English, even though it is perfectly grammatical. Being able to use just the right phrases signals native fluency in a speaker.
4. There are at least four types of phrases:
 (classification based on Lewis, 1997 and Smadja, 1994). The typology is not meant to be exhaustive or complete; other classifications may be possible.
 a) Polywords: generally 1-3 word fixed phrases conveying a unique idiomatic sense. Polywords allow for no variation or reversal of word order. Example: "by the way," "nevertheless," "bread and butter," "every now and then."
 b) Collocations: words that occur next to each other in more than random frequencies and in ways that are not generalizable:
  Example: "perfectly acceptable," "stock market slide," "sales representative."
 Variation in collocations is possible, but restricted by linguistic usage: "a tall building," "a tall boy" (but not: "a high building," "a high boy"); "to take a look at a problem" (not: "to gaze at a problem"); "anxiety attack" (not "fear attack"), but also an "asthma attack," a "hay-fever attack."
 (c) Standardized, idiomatic expressions with limited variability, often used in formulaic greetings and social interaction routines:
  Example: "How's it going?" "How are you doing?" a "Thanks, I'm fine [great:terrific]." "Talk to you later."
 (d) Non-contiguous phrases: functional frames containing one or more slots that can be filled by a limited number of words. The meaning of the phrase is determined by the filler word. The set of legitimate filler words tends to be determined by world knowledge rather than linguistic usage.
  Example: "Can you pass me the . . . , please?" Here, the filler can be any small object that can be "passed on" by hand: "salt," "pepper," "bread," "water," but not "house," "tree," "sewing-machine" etc.
  I have a . . . in my shoe can be filled by e.g., "stone," "pebble," "something", but not by "elephant."
5. Because they are fixed in the mental lexicon of the speakers of the language, some word combinations are more likely to be observed/chosen in actual discourse than other combinations. This is why usage patterns and their frequencies can be analyzed using statistical methods, and can be captured in probabilistic models that reveal these patterns.
6. Phrases are relatively unambiguous in their meaning or intention. Ambiguity arises when an utterance can have more than one conceptual meaning. The source of ambiguity can be either lexical (a word can have 2 or more unrelated meanings. E.g., "suit"=1. a piece of clothing, 2. a legal dispute), syntactic (a sentence can have two or more different and equally plausible parses (e.g. "he killed the man with a knife," where the modifier "with a knife" can either refer to VP (the act of killing) or to the NP (the object of killing). Because phrases use words in context, they reduce semantic ambiguity (wearing a suit vs. filing a suit) and some cases of syntactic ambiguity.
7. Phrasal usage is not an exclusive property of spoken, conversational language. Rather, phrase usage pertains to all forms and genres of spoken and written discourse. However, each of these genres may use different types of phrases, and a computational analysis of linguistic preferences in terms of phrase frequencies and probabilities is likely to reveal different patterns of usage depending on the genre.

8. Nor is phrasal usage an exclusive property of English. Most languages are governed by it albeit in different ways. Generally speaking, phrases do not translate word for word into other languages. A literal translation, for example, of "get your act together" into German yields a meaningless construct "bring deine Tat zusammen." However, many phrases have functional phrase equivalents in other languages, e.g., "getting one's act together"=>"sich zusammenreiβen."

d. Goal of the Invention

The goal of the present invention is twofold:

1. To implement a phrase-based, corpus driven natural language processing technique that can reveal overarching discourse patterns without requiring laborious hand-tagging of training data in terms of syntactic, semantic, or pragmatic utterance features. As Lewis puts it: "Grammar tends to become lexis as the event becomes more probable" (p. 41). That is to say, syntactic, semantic, and pragmatic structures are embedded in the phrase and are modeled along with it, provided the analysis is based on a conversational speech corpus large enough for statistical modeling.

2. To implement the process described under 1) above in such a way that the resulting linguistic knowledge can be stored in a machine readable database, and used (and reused repeatedly) in a computer system designed to generate recognition grammars for voice-interactive dialogue systems.

e. Data Resources

Statistical modeling of any kind requires a vast amount of data. To build a sizable phrase thesaurus of 500,000 to 1 Million entries requires a large source corpus (on the order of 1 billion words). However, smaller and more specialized corpora may be used to model phrases in a particular domain. For a phrase thesaurus covering the domain of interactive discourse, a number of diverse resources may be used to compile a text corpus for language. Such resources include but are not limited to:

1. Transcribed speech databases for task oriented interactive discourse (SWITCHBOARD, CallHome, and TRAINS (available from the Linguistic Data Consortium (LDC) at www.ldc.upenn.edu).

2. User data collected from verbal interactions with existing dialogue systems or with simulations of such systems.

3. Closed caption data from television programs containing large amounts of interactive dialogue, such as talk shows, dramas, movies, etc. Television transcripts tend to be highly accurate (95%-100% for off-line captioned programs) (Jensema, 1996). As a consequence, virtually unlimited amounts of data can be purchased from places that gather and disseminate this data.

Television transcripts are a good way of supplementing databases of task-oriented discourse (1. and 2.) Even though most television shows are scripted, they nonetheless contain large amounts of common dialogic structures, good idiomatic English etc. What is missing is mainly the fragmented, discontinuous nature of most conversational speech. However, this difference may well be an advantage in that models based on well-formed conversational speech might be used to identify and repair elliptical speech.

f. Data Preparation

To prepare the corpus for phrase modeling, it is subjected to a normalization procedure that marks sentence boundaries, identifies acronyms, and expands abbreviations, dates, times, and monetary amounts into full words. This normalization process is necessary because the phrase thesaurus is used to create grammars for recognition systems, and recognizers transcribe utterances as they are spoken, not as they are written. This means that monetary amounts, e.g., $2.50, must be spelled out in the recognition grammar as "two dollars and fifty cents" in order to be recognized correctly. The procedure also eliminates non-alphanumeric characters and other errors that are often found in television transcripts as a result of transmission errors in the caption delivery.

The normalization process is carried out by running a sequence of computer programs that act as filters. In the normalization process, raw text data is taken as input and a cleaned-up, expanded corpus that is segmented into sentence units is output. Sentence segmentation is especially important because the subsequent phrase modeling procedure takes the sentence as the basic unit.

The invention can make use of a version of a text normalization toolkit that has been made freely available to the speech research community (Copyright 1994, University of Pennsylvania, available through the Linguistic Data Consortium).

g. Compiling a Seed Dictionary of Phrase Candidates

The first step and the precondition for building a phrase thesaurus from a corpus is a creating a seed dictionary of likely phrase candidates. Initially, existing on-line idiomatic dictionaries are searched for basic phrase candidates that are rigid and not subject to grammatical or lexical variation (section 1. C. 4 a-c). The words and phrases are compiled into a basic phrase list. Less rigid collocations and phrasal templates are subject to considerable lexical and grammatical variability, and therefore, empirical text data are needed that contain actual instances of their use. To compile an initial seed phrase dictionary, we derive collocations automatically from large corpora on the basis of simple frequency counts, and then subject the results to a post-processing heuristics to eliminate invalid collocations.

Step 1: Deriving n-Grams

We begin by deriving n-gram statistics from a given corpus C1 using standard language modeling techniques. For an overview of such techniques, see Frederik Jelinek, Frederick, *Statistical Methods for Speech Recognition*, MIT, Cambridge Mass., 1997). The procedure generates information about how often word strings of n-word length occur in a given corpus.

Input: A given Corpus C1→Output: n-gram frequency counts.

We choose n-grams of varying lengths (approximately $1<=n<=7$.) N-grams are sorted in the order of the frequency of their occurrence.

Step 2: Filtering: Deriving Valid Phrase Candidates from n-Grams

The list of n-grams is very large and contains many invalid and meaningless collocations, phrase fragments, and redundant word combinations that are subsumed by larger n-grams.

Take for example, the following sentence: <s> e-mail is replacing to a large extent direct communication between people </s>.

For $1<=n<=7$, n-gram frequency counts on this sentence, including sentence boundary markers, will return 70 unique n-grams (13 unigrams, 12 bigrams, 11 trigrams, 10 4-grams, 9 5-grams, 8 6-grams, and 7 7-grams). By contrast, the sentence contains only four potentially valid phrase candidates, two of which are partially overlapping:
- (a) Phrase template: "replacing [ . . . ] communication"
- (b) Multi-word: "to a large extent"
- (c) Compound noun collocation: "direct communication"
- (d) Mixed collocation: "communications between people"

The next step consists of filtering n-grams to eliminate invalid or redundant collocations by implementing a series of computational measures to determine the strength of any given collocation. The problem of n-gram filtering can be approached in a number of different ways, and the following description is meant to be exemplifying rather than being exhaustive. Since the goal at this point is to compile a preliminary seed dictionary of phrases, any of the methods described below can be used, either by themselves or in combination, to identify initial phrase candidates.

A Frequency-Based Pre-Filtering Method

The simplest filtering method is frequency-based. Computed over a large corpus, n-grams with high frequency counts are more likely to contain strong collocations than n-grams that occur only once or twice. We eliminate n-grams below a specific frequency threshold. The threshold is lower for large word strings because recurring combinations of large n-grams are rarer, and more likely to contain significant phrase candidates than shorter strings.

Perplexity/Entropy

Perplexity is a measure for determining the average branching factor of a recognition network and it is most often used as a measure for evaluating language models. It indicates the probability, computed over an entire network, that any given element can be followed by any other. For example, in a digit recognition system composed of 0-9 digits and two pronunciations for 0 ("oh" and "zero"), the perplexity of the recognition grammar exactly equals the number of elements, 11, because there are no constraining factors that favor certain digit sequences over others. Because word sequences underlie various kinds of constraints (imposed by syntax, morphology, idiomatic usage etc.) perplexity has been found useful in natural language processing to measure the strength of certain collocations (see, for example, Shimohata, S, T. Sugio, J. Nagata, "Retrieving Collocations by Co-occurrence and Word Order Constraints," Proceedings of the 35th Annual Meeting of the Association for Computational Linguistics, 1997, pp. 476-481.)

We take each unique n-gram and its associated frequency f(n-gram) and look at the probability of each word $w_i$ that can follow the n-gram. We calculate this probability $p(w_i)$ by dividing the frequency in which a given word follows the n-gram by the frequency count for the n-gram itself $$p(w_i) = \frac{f(wi)}{f(n-\text{gram})}$$

If the n-gram is part of a larger, strong collocation, the choice of words adjacent to the phrase boundary will be very small, because of the internal constraint of the collocation. Conversely, the likelihood that a particular word will follow is very high. For example, the word following the trigram "to a large" will almost always be "extent," which means, the perplexity is low, and the trigram is subsumed under the fixed collocation "to a large extent." On the other hand, a large number of different words can precede or follow the phrase "to a large extent," and the probability that any particular word will follow is very small (close to 0).

We use a standard entropy measure to calculate the internal co-locational constraints of the n-gram at a given junction wi as:

$$H(n-\text{gram}) = \sum_{(i=word_j)} -p(w_i)\ln p(w_i)$$

The perplexity of the n-gram can then be defined as:

$$\text{Prep}(n\text{-gram}) = e^{H(n\text{-gram})}$$

We eliminate n-grams with low surrounding perplexity as redundant (subsumed in larger collocations) and keep the ones with perplexity above a specified threshold t.

Step 3: Deriving Non-Contiguous Phrases

The frequency and perplexity measures described above give us a good first cut at phrase candidates, generating mainly rigid word combinations such as compound nouns ("Grade Point Average"), idiomatic expressions ("How's it going?") and polywords ("sooner or later"). The next objective is to expand the initial seed phrase dictionary by deriving non-contiguous collocations (collocations that are less rigid and contain one or more filler words or phrases, e.g. "Give me . . . please"). There are at least three types of non-contiguous phrases. Assuming that w is any word and p is any phrase, these types can be distinguished as follows:

Type 1: $p_1$ . . . $p_2$
Two phrases occurring next to each other with more than random frequency, separated by one or more words that are not themselves phrases.
Example: "refer to [the appendix:the manual: page 220 . . . ] for more information"

Type 2: $p_1$ . . . $w_1$
A phrase is followed or preceded by one or more filler words, which are followed or preceded by another word that, together with the initial phrase, forms a phrase template.
Example: "Could you hand me [the salt:your ID . . . ] please?"

Type 3: $w_1$ . . . $w_2$
A word is followed by one or more filler words, which are followed by another word that together with the initial word forms a phrase template.
Example: "taking [initial:the first: important . . . ] steps"

To extract phrases of the types 1 and 2, we first create a list of contexts for each phrase. We take each of the phrase candidates obtained in the first processing phase and retrieve all sentences containing the phrase. We then look at surrounding words in order to identify possible regularities and co-occurrence patterns with words or phrases not captured in the initial n-gram modeling and filtering stage. This can be done using any of the following methods: frequency counts, normalized frequency methods, perplexity, or normalized perplexity.

In order to handle Type 3, we compile a list of the top n most frequent word bigrams separated by up to 5 words. As in the first extraction stage, not every collocation is significant. Again, there are several ways to eliminate invalid collocations that can be used by themselves or in various combinations. Again, this can be done using any of the following methods: frequency counts, normalized frequency methods, perplexity, or normalized perplexity.

Mutual Information

Mutual information is a standard information theoretical measure that computes the strength of a relationship between two points by comparing the joint probability of observing the two points together with the probability of observing them independently. In natural language processing, it has been used to establish the strength of an association between words, for example, for use in lexicography (see Kenneth Church, W. & Patrick Hanks, "Word Association Norms, Mutual Information, and Lexicography," *Computational Linguistics*, 16 (1), 1990: 22-29.)

Given two phrases, q1 and q2 with probabilities p(q1) and p(q2) then the mutual information I (q1, q2) is defined as:

$$I(q1, q2) = \frac{p(q_1, q_2)}{p(q_1)p(q_2)}$$

Joint probability can serve as a measure to determine the strength of a collocation within a given window (in our case, a sentence), even if the collocation is interrupted, as in the case of non-contiguous phrases. If there is a genuine association between two words or word strings, their joint probability will be larger than the probability of observing them independently, so the mutual information I(w1,w2) must be greater than 1.

We take our corpus of non-contiguous phrase candidates and compute the mutual information for each phrase and the most frequent words or word sequences surrounding these phrases. We extract the phrase-word or phrase-phrase combinations with the highest joint probability However, the above formula may generate misleading results in case of very frequently used words such as "the," "it," or "very good." In this case we will use a slightly modified mutual information defined as:

$$I_{new}(q1, q2) = \frac{p(q_1, q_2)}{p(q_1)}$$

where q2 is the frequent word or phrase.

Probability Distribution

Yet another way to eliminate invalid phrase candidates is to look at probability distribution of components within each non-contiguous phrase candidate. For each phrase candidate, we determine a main component and a sub-component (the longer or the more frequent phrases can usually be considered as the main component), and then look at the probability distribution of the sub-component with respect to other words or candidate phrases that co-occur in the same context (i.e., sentence or clause). This algorithm can be formally described as:

$$M_{main,sub} = \frac{f(q_{main}, q_{sub}) - \text{Exp}(q_{main})}{Dev(q_{main})}$$

where $f(q_{main}, q_{sub})$ is the frequency of the co-occurrence of the main component with the sub-component and $\text{Exp}(q_{main})$ & $Dev(q_{main})$ are the Expected Value and the Standard Deviation of the frequency occurrence of $q_{main}$ with all of the sub-components $q_{sub}$, We can assume that if $M_{main, sub}$ is greater than a certain threshold, then the collocation is a valid phrase, otherwise it is not.

Hand Checking

A final way of eliminating invalid phrases—especially cases determined as borderline by the other algorithms—is by having a trained linguist go through the resulting phrase dictionary and eliminate the unlikely phrases.

Step 4: Phrase-Based Corpus Segmentation

As explained in the previous section, a number of measures can be (and have been) used to automatically derive an initial seed dictionary of phrase candidates from large corpora. Because all of these methods act more or less as filters, they can be used in various combinations to extract multi-word phrases and collocations. However, whatever method we use, the list of derived phrases still contain a large number of overlapping phrase candidates, because multiple parses of the same sentence remain a possibility. For example, for the sentence "E-mail is replacing direct communications between people," the following alternative parses are conceivable:

Parse 1: <s>[E-mail] [is replacing] [direct communications] [between people]</s>
Parse 2: <s>[E-mail] [is replacing direct communications] [between people]</s>
Parse 3: <s>[E-mail] [is replacing] [direct] [communications between people.]</s>

The problem is similar to the one we encounter when segmenting text for building dictionaries in Chinese or Japanese. In these languages, the concept of a "word" is less well defined than it is in European languages. Each Chinese word is made up of anywhere between one and seven characters, and in Chinese writing, word boundaries are not separated by white spaces. The problem is augmented by the fact that complete Chinese dictionaries are extremely hard to find, especially when it comes to proper names.

The absence of word boundaries in Chinese or Japanese creates significant difficulties when building probabilistic language models for large vocabulary dictation systems. Word-based n-gram language modeling requires correct parsing of sentences to identify word boundaries and subsequently calculate n-gram probabilities. Parsing errors are a common problem in Chinese language processing. For example, we may encounter a character sequence ABCDE where A, AB, CDE, BCD, D, and E are all legitimate words in the dictionary. One can quickly note that there are two possible parses for this character sequence: [A] [BCD] [E] and [AB] [CDE]. Linguists have applied various lexical, statistical, and heuristical approaches, by themselves and in combination, to parse Chinese text. Most of these methods can be applied to phrase parsing in English. We describe one statistical, n-gram-based parsing algorithm that we found particularly efficient and useful. However, other methods can be used for phrase parsing as well.

The general idea is to implement an N-gram phrase-based language model (a language model that uses phrases rather than single words as the basis for n-gram modeling), in order to calculate the best parse of a sentence. Note that some words may act as phrases as can be seen in Sentence 3 (e.g. the word "direct" in the above example). Assuming the log probability bigram statistics for the example above to be as follows:

[<s>], [Email]—-5.8
[Email], [is replacing]—-2.4
[Email], [is replacing direct communications]—-6.5
[is replacing], [direct]—-4.7
[is replacing], [direct communications]—-5.4
[direct], [communication between people]—-4.2
[direct communications], [between people]—-6.2
[is replacing direct communications], [between people]—-8.9
[between people] [<s>]—-4.8
[communication between people] [<s>]—-5.9

Given these log probabilities, we can calculate the best phrase-based parse through a sentence by multiplying the CD probabilities (or summing the log probabilities) of each of the bigrams for each possible parse:

$$\text{Parse1}_{Total\ likelihood} = -5.8 + -2.4 + -5.4 + -6.2 + -4.8 = -24.6$$

$$\text{Parse2}_{Total\ Likelihood} = -5.8 + -6.5 + -8.9 + -4.8 = -26.0$$

$$\text{Parse3}_{Total\ likelihood} = -5.8 + -2.4 + -4.7 + -4.2 + -5.9 = -23.0$$

We select the parse with the highest overall likelihood as the best parse (in this case, parse 1).

A First Pass at Phrase-Based n-Gram Parsing

In order to create a phrase-based parse of a given text corpus C, we need a phrase-based language model. Building such a language model, however, requires a pre-parsed text or a dictionary of phrases. In order to get around this problem, we use a bootstrapping technique that provides us with an initial parse of the corpus, which will then form the basis for building an initial language model that is subsequently refined by iterating the procedure. There are two ways to derive a preliminary parse through the corpus:

1. We use a Greedy Algorithm that, whenever it encounters a parsing ambiguity (more than one parse is possible), selects the longest phrases (e.g., the parse that produces the longest phrase or the parse that produces the longest first phrase) from the seed dictionary. In the above example, parse2 would be selected as the optimal parse.
2. We pick the parse that minimizes the number of phrases for each parse. Assuming that neither the phrase "is replacing direct communications" (because it is not a very common phrase) nor the word "direct" are in the seed dictionary, parse 1 would be selected.

Applying either one or both of these algorithms will result in an initial phrase-based parse of our corpus.

Optimizing the Phrase-Based n-Gram Parse

Once we have an initial parse through our corpus, we divide the corpus into two sub-corpora of equal size, C1 and C2 and use the seed dictionary of phrases (described in section 1 b-d) to build an initial language model for one of the sub-corpora. We then use this language model to generate an improved segmentation of the other sub-corpus C2. Resulting high-frequency bigrams and trigrams are phrase candidates that can be added to the dictionary for improved segmentation.

A significant advantage of using a language modeling technique to iteratively refine corpus segmentation is that this technique allows us to identify new phrases and collocations and thereby enlarge our initial phrase dictionary. A language model based corpus segmentation assigns probabilities not only to phrases contained in the dictionary, but to unseen phrases as well (phrases not included in the dictionary). Recurring unseen phrases encountered in the parses with the highest unigram probability score are likely to be significant fixed phrases rather than just random word sequences. By keeping track of unseen phrases and selecting recurring phrases with the highest unigram probabilities, we identify new collocations that can be added to the dictionary.

There are two ways of implementing this procedure. In the first case, we start a unigram language model, and use this model to segment sub-corpus C2. The segmented sub-corpus C2 is subsequently used to build a new, improved unigram language model on the initial sub-corpus C1. We iterate the procedure until we see little change in the unigram probability scores. At this point we switch to a bigram language model (based on phrase pairs) and reiterate the language modeling process until we see very little change. Then we use a tri-gram model (based on sequences of three phrases) and reiterate the procedure again until we see little changes in the segmentation statistics and few new, unseen phrases. At this point, our dictionary contains a large number of plausible phrase candidates and we have obtained a fairly good parse through each utterance.

In the second case, we implement the same iterative language modeling procedure, using bigram, trigram, or even n-gram models with larger units, in the very beginning of the process rather than increasing gradually from unigram to trigram models. One or the other implementation may prove more effective, depending on the type of source material and other variables.

h. Automatically Deriving a Phrase Thesaurus from a Seed Dictionary of Phrases

The core of the proposed technology is a phrase thesaurus, a lexicon of fixed phrases and collocations. The thesaurus differs from the seed dictionary of phrases in that it groups phrases that are close in content and in some sense interchangeable. The grouping is essential for the use of the phrase database in the context of the proposed invention, namely, to allow for the retrieval of alternative phrase variants that can be used to automatically create a grammar network. We use a matrix manipulation measure to determine the semantic distance between phrases contained in our phrase dictionary. Once we have a measure of closeness/distance between phrases, we can use this information and a standard clustering algorithm (e.g., Group Average Agglomerative Clustering) to derive sets of semantically similar phrases.

Step 1: Measuring Distance Between Phrases

In order to derive a measure for determining semantic distance between phrases, we draw on two basic linguistic assumptions:

1. The meaning of a word is determined by its use. Mastering a language is the ability to use the right words in the right situation.
2. The degree of similarity between two words can be inferred from the similarity of the contexts in which a they appear. Two words are synonymous if they are completely interchangeable in all contexts. Two words are similar if they share a subset of their mutual contexts.

We take these assumptions to hold true not only for isolated words, but for phrases as well. To determine semantic proximity or distance between phrases, we look at the surrounding words and phrases that co-occur with any given phrase P across an entire machine-readable corpus C, and measure the extent to which these contexts overlap. For example, we will find that the phrases "can you hand me . . . " and "can you pass me . . . " share a large subset of neighboring words: "salt," "coffee," "hammer," "the paper," "my glasses," etc. Conversely, we find no overlap in the neighbors of the phrases "can you pass me . . . " and "can you tell me . . . ."

To represent and measure semantic and/or syntactic relationships between phrases, we model each phrase by its context, and then use similarities between contexts to measure the similarity between phrases. One can imagine that each phrase is modeled by a vector in a multi-dimensional space where each dimension is used for one context. The degree of overlap between vectors indicates the degree of similarity between phrases. A simple example illustrates how to represent contextual relationships between phrases and their associated neighbors in such a space. For the two phrases, P1: "can you hand me . . . " and P2: "can you show me . . . ," we create an entry in a 2 dimensional matrix for each time they co-occur with one of two right neighbors, "the salt," and "your ID." The example shows that the phrases P1 and P2 share some but not all of the same contexts. P1 occurs 136 times with "your ID" but never (0 times) with "the salt," P2 co-occurs 348 times with "the salt" and 250 times with your ID.

We can capture this co-occurrence pattern geometrically in a two-dimensional space in which the phrases P1 and P2 represent the two dimensions, and the contexts "the salt" and "Your ID" represent points in this space. (FIG. 1) The context the salt is located at point 0,348 in this space because it occurs never (0 times) times with P1 and 348 times with P2.

The degree of similarity between contexts can be determined by using some kind of association measure between the word vectors. Association coefficients are commonly used in the area of Information Retrieval, and include, among others, the following: Dice coefficient, Jaccard's coefficient, Overlap coefficient and Cosine coefficient (for an Overview, see C. J. van Rijsbergen, *Information Retrieval*, 2nd ed., London, Butterworths, 1979). There is little difference between these measures in terms of efficiency, and several of these coefficients may be used to determine the difference between phrases. The most straightforward one is the Cosine coefficient, which defines the angle θ between the two word vectors as follows:

$$\cos\Theta = \frac{A^\top B}{\|A\|\|B\|}$$

Step 2: Singular Value Decomposition

Using either of the formulas described in Step 1 will give us an initial distance measure between phrases. Assuming the phrase dictionary derived so far contains N phrases (with N being anywhere from 500,000 to 1,000,000), and assuming further that we parameterize each key-phrase with only the most frequent M phrases (with M being between 500,000 and 100,000 depending on a number of variables), then we still have two problems:
1. The resulting M×N matrix may be too large (500,000× 100,000) to compare vectors.
2. Because of the sparseness of data, many context phrases or words will not appear in the context of their respective key phrases. For less frequent phrases or context phrases, the vector model might therefore yield misleading and inaccurate results.

In order to get around both of these problems we can use Singular Value Decomposition (SVD) to reduce the original matrix to a smaller and informationally richer matrix. We describe the original matrix as follows: each row is used for one key-phrase and each column is used for one of the M context-phrases. So $c_{ij}$ is the number of occurrences of the phrase $p_j$ in the context of phrase $p_i$. The standard SVD algorithm for a matrix A of size M×N allows us to express A as a product of a M×N column-orthogonal matrix U, a diagonal matrix S of size N×N whose elements are either positive or zero, and transpose of another N×N row-orthonormal matrix V. This can be summarized as follows:

$$A = U \cdot S \cdot V^T$$

The shapes of these matrices can be visualized as a series of columns, as shown in FIG. 2.

The advantage of using SVD is that it allows us to break down the matrix into its individual components and to reduce the size of the matrix by as much as one order of magnitude by eliminating unwanted or meaningless components. If the matrix is singular, some of the $s_n$ will be zero and some are going to be very small. By eliminating these elements and reducing the matrix in size, we can make the matrix smaller and more manageable. Moreover, the reduced matrix $A_{new}$ contains only the most significant elements of the original matrix A. Assuming that the $s_{n-1}$ was very small and $s_n$ was zero and we decide to eliminate these columns from the original matrix, the result would be a (M)×(N−2) matrix made from the first N−2 columns of U, S, & V, as shown in FIG. 3.

Note that Factor Analysis or any other kind of Principle Component Analysis with dimensionality reduction might work just as well in this case.

Step 3: Phrase Clustering

The next step in creating a phrase thesaurus consists of clustering phrases into classes based on the degree of overlap between distance vectors. A number of standard clustering algorithms have been described in the literature. The most efficient ones include Single Link, Complete Link, Group Average, and Ward's algorithm. These algorithms are typically used to classify documents for information retrieval, and, depending on the particular data being modeled, one or the other has been shown to be more efficient. For a discussion of clustering algorithms, see, e.g., (El Hamdouchi, A. and P. Willett, "Hierarchic Document Clustering using Ward's Method," Proceedings of the Organization of the 1986 ACM Conference on Research and Development in Information Retrieval, 1988, pp. 149-156; El Hamdouchi, A. and P. Willett, "Comparison of Hierarchic Agglomerative Clustering Methods for Document Retrieval," The Computer Journal 32.3, 1989, pp. 220-227; Cutting, Douglas, R., David R. Krager, Jan O. Pedersen, John W. Tukey, "Scatter/Gather: A Cluster-Based Approach to Browsing Large Document Collections," Proceedings of the 15th Annual International SIGIR '92, Denmark, pp. 318-329.

All of these clustering algorithms are "agglomerative" in that they iteratively group similar items, and "global" in that they consider all items in every step.

We can use one or the other of these algorithms to cluster similar phrases into equivalence classes by performing the following steps:
a) Calculate all inter-phrase similarity coefficients. Assuming $q_x$ and $q_y$ are any two phrases, they can be represented by rows X & Y of $A_{new}$ from Step 2, so the similarity between any two phrases using the Cosine coefficient would be:

$$S_{cos}(q_x, q_y) = \frac{q_x^\top \cdot q_y}{\|q_x\|\|q_y\|}$$

b) Assign each phrase to its own cluster
c) Form a new cluster by combining the most similar pair of current clusters (r, s)
d) Update the inter-phrase similarity coefficients for all distances using r & s.
e) Go to step (c) if the total number of clusters is greater than some specified number N.

Clustering algorithms differ in how they agglomerate clusters. Single Link joins clusters whose members share maximum similarity. In the case of Complete Link, clusters that are least similar are joined last, or rather an item is assigned to a cluster if it is more similar to the most dissimilar member of that cluster than to the most dissimilar member of any other cluster. Group Average clusters items according to their average similarity. Ward's method joins two clusters when this joining results in the least increase in the sum of distances from each item to the centroid of that cluster.

Clustering techniques tend to be resource intensive, and some initial seeding of clusters, based on rough guesses, may be necessary. The Buckshot algorithm (Cutting, et. al., 1992) can be used to accomplish this goal. Buckshot starts with a small random number of clusters and then uses the resulting cluster centers (and just these centers) to find the right clusters for the other items. One could imagine other similar algorithms that take some initial guesses at the cluster center, and then use the cluster center (or even the top N items that can be considered as the closest to the center), and find the other buckets accordingly.

We can use any one of these clustering algorithms or a combination of them depending on the computational resources required and other factors to derive both flat and hierarchical groupings of phrases.

Step 4: Hand Tagging of Classes

In a final step, a sub-set of the hand-checked phrase classes are tagged with abstract descriptors denoting abstract conceptual representations of the phrases contained in each class. Descriptors include speech act classifications for verb phrases (e.g. request [ . . . ], confirm [ . . . ], reject [ . . . ], clarify [ . . . ] etc. and object nouns (e.g. date, location, time, amount,) and proper names (businesses, restaurants, cities, etc.).

The phrases in a phrase thesaurus produced in accordance with the invention can be arranged in a hierarchical manner. For example, phrases that can occur as part of other phrases can be represented once in the phrase thesaurus and each other phrase that can include such phrase can include a pointer to that phrase. This can be desirable to enable the phrase thesaurus to be represented more compactly, thus decreasing the data storage capacity required to store the data representing the phrase thesaurus.

i. A Computer System for Automatically Creating Recognition Grammars

The phrase thesaurus described above can be implemented as part of a computer system that can be used to automatically generate complex recognition grammar for speech recognition systems. The recognition grammar can then be used with an interactive user interface that is responsive to spoken input (voice input). The recognition grammar enables interpretation of the spoken input to the user interface. The system combines call-flow design, network expansion, and grammar compilation into a single development tool. The thesaurus forms the key element of this system, but in order to function in the manner desired, it must be integrated and work together with a number of other system components.

The system consists of the following components: (a) a graphical user interface for designing and editing the call flow for a voice application, (b) a network expander that retrieves alternative variants for the user commands specified in the call-flow design from the database along with their probabilities, (c) a linguistic database, (d) an editor, and (e) a compiler that translates the grammar network into a format than can be used by commercial speech recognizers.

(a) Call flow Design: The first step in designing a recognition network for a voice controlled dialogue system consists of specifying the call flow in such a way as to anticipate the logic of the interaction. The system's graphical user interface allows for two different design modes: a graphical mode, and a text mode. In the graphical mode, the designer specifies user requests, system states, and the transitions between these states by using and manipulating icons that can be connected by arrows to indicate the logic of the interaction. The system comes with a set of standard icons (for greetings, yes/no, system confirmation, request for clarification, etc.), but the designer can define additional icons. The user can subsequently add text to each node by clicking on an icon indicating a user request. FIG. 4 shows the initial part of a call flow for a simple restaurant in both graphical and text mode. For the user request type: request restaurant information, the designer only needs to specify one example, of making such a request. For each user request, the grammar specifies the set of legitimate variants. Note that the system will not recognize speech input that is not explicitly specified in the grammar.

(b) Network expander: In a second step, the user nodes in the call flow design are automatically expanded to include a near exhaustive set of possible user responses to any given system prompt. FIG. 5 shows the type of network that needs to be generated to recognize the user response to the systems prompt "what kind of food you like to eat?" For each user request, the grammar specifies the set of legitimate variants. Note that the system will not recognize speech input that is not explicitly specified in the grammar. If the recognition system allows for probabilistic grammars, the Network Expander can supply frequency and other probabilistic bigram and trigram statistics to build such a grammar.

To activate the network expansion functionality, the designer clicks on a network expansion icon. This will prompt the system to take the utterances specified in each user node and automatically retrieve alternative variants from the database. For example, suppose we want to model a user request for help. For the phrase "I need help," the network expander will return: "What do I do now?," "Help!," "Help me, please," "I could need some help here!," "Can you help me?," "I'm lost, I don't know what to do," "Oops, something's wrong!," etc.

Phrases can be expanded in the order of frequency of occurrence, that is, most likely variants are listed first, with others following in the order of descending frequencies. Expanded icons can be viewed as lists of phrases or in annotation mode. In this mode, the abstract meaning representation(s) for the selected phrases can be accessed and modified. For phrases with overlapping or no representation, the designer can supply customized representations required by the context.

(c) Linguistic Database: The linguistic knowledge required for the automatic network expansion is stored in a large, machine-searchable database. The database contains the phrase thesaurus (along with probability scores associated with each phrase). In addition, it contains lists of common nouns for filling phrase templates, as well as locations, dates, proper names etc. The database is customizable, that is, users can create their own application specific lists of objects, names etc.

(d) Editor: The grammar designer provides editing functionality at all stages in the design process. Initial call flow designs can be saved, retrieved, and changed in both graphical and text mode. After the network has been expanded, the designer can go back to the initial call flow design, click on an icon, and view/edit the phrase variants retrieved by the system. At this stage, most of the editing activity will consist of eliminating variants that don't fit the pragmatic context, and of completing phrase templates by accessing the supplemental databases provided by the system or by typing in the template fillers directly. In the annotation mode, the user can review and modify the meaning representations automatically supplied by the system. At all times during the design process, users can view and edit their work in any one of the modes provided by the system (graphical call-flow, call flow text mode, expansion mode).

(e) Compiler: After completing the editing, the user activates the system compiler, which executes a computer program that translates the grammar network design into a format that can be used by the recognizer.

2. A Natural Language Understanding Component to be Used in Speech Recognition Systems In another aspect of the invention a compiled sub-set of the phrase thesaurus is incorporated into a speech recognition system to be accessed at run-time in order to parse the incoming speech signal and to derive an abstract conceptual representation of its meaning that is passed on to the application. The phrase subset used in the run-time natural language interpreter is identical to the one used in a particular grammar. (Recall that the grammar specifies the total set of user commands the system expects and is able to process. Commands not specified in the grammar are automatically assigned to a single variable that triggers a system request for clarification.)

To illustrate this aspect of the present invention, we describe how the grammar and the natural language understanding component function within the context of a conventional speech recognition system. This aspect of the invention is particularly concerned with components 1 (e) and 2 in the description provided below; the other components are part of a typical speech recognition system and are included in the description to clarify the operation of the invention.

The operation of a voice-interactive application entails processing acoustic, syntactic, semantic, and pragmatic information derived from the user input in such a way as to generate a desired response from the application. This process is controlled by the interaction of four separate but interrelated components, as shown in FIG. 6.

1. a speech recognition front-end 20 consisting of (a) an acoustic signal analyzer 22, (b) a decoded 24, (c) a recognition grammar 26 (Sehda Grammar), (d) phone models 28, and (e) a phonetic dictionary 30
2. A Natural Language Understanding (NLU) component 32 consisting of
Natural Language Understanding 34 and a NLU module 36 (Sehda NLU module)
3. a dialogue manager 38
4. a speech output back end 40 (an application interface and response generation component 42)

1. When a speech signal or voice 18 is received through a microphone or telephone hand-set, its acoustic features are analyzed by the acoustic signal decoder 24 and a set n of the most probable word hypotheses are computed based on the acoustic information contained in the signal, and the phonetic transcriptions contained in the dictionary. The recognition hypotheses are constrained by a recognition grammar that defines the user choices and tells the system what commands to expect at each point in a given interaction. Because the grammar specifies only legitimate word sequences, it narrows down the hypotheses generated by the acoustic signal analyzer 22 to a limited number of possible commands that are processed by the system at any given point.
2. The NLU component 32 translates the utterances specified in the recognition grammar 26 into a formalized set of instructions that can be processed by the application.
3. The dialogue manager 38 passes the commands received from the NLU component 32 on to the application via the application interface 42 (component 3) and processes the system response. This response can be an action performed by the system, e.g., to access a database 44 and retrieve a piece of information. It can also be for verbal system response, e.g. a request for clarification, "Do you want Edgar Smith or Frank Smith?, or it can be a combination of both.

The speech-output back-end (component 4) takes the verbal response generated by the dialogue manager and maps it to an acoustic speech signal, using either a speech synthesizer or prerecorded utterances from a database. (For a comprehensive overview of state-of-the-art dialogue systems, their operation, and assessment, see Ronald Cole, A. J. Mariani, Hans Uszkoreit, Annie Zaenen, Victor Zue, "Survey of the State of the Art in Human Language Technology," Center for Spoken Language Understanding, Oregon Graduate Institute, 1995, and EAGLES, *Handbook of Standards and Resources for Spoken Dialogue Systems*, De Gruyter, Berlin & New York, 1997.

This aspect of the invention particularly concerns the NLU component. In conventional spoken dialogue systems, recognition grammars are mapped onto a set of formalized instructions by using a crude technique called "word spotting." Word spotting proceeds from a given set of instructions and then searches the user input for specific words that match these instructions. Word spotting works by disregarding utterances or parts of utterances that are deemed irrelevant at a given state of the user-machine interaction. Word spotting works for very simple systems, but it is limited by the fact that it cannot recognize negations or more complex syntactic relationships.

In the present invention, recognition grammars are mapped to system instructions by way of an annotation scheme that extracts the abstract meaning from a number of alternative phrase variants. This is possible because the underlying thesaurus database classifies phrases according to semantic similarity and contains pre-tagged descriptors for each class. At run-time, user speech input is parsed automatically into phrase-based units, which are subsequently translated into system instructions.

Various embodiments of the invention have been described. The descriptions are intended to be illustrative, not limitative. Thus, it will be apparent to one skilled in the art that certain modifications may be made to the invention as described herein without departing from the scope of the claims set out below.

What is claimed is:

1. A speech recognition computer system comprising:
an acoustic signal analyzer that generates acoustic features from a digital speech signal representing spoken input;
a first recognition grammar based on a first language;
a second recognition grammar based on a second language;
wherein either one or both of the recognition grammars are coupled to a probabilistic phrase thesaurus including a data structure of phrases classified according to at least semantic similarity, and wherein either one or both of the recognition grammars specify legitimate word sequences representing conceptual meaning from alternative phrase variants of a language;
a phonetic dictionary having phonetic transcriptions of acoustic features; and
an acoustic decoder coupled with the acoustic signal analyzer, the recognition grammars, and the phonetic dictionary and that:

computes a set of most probable word hypotheses based on the acoustic features from the digital speech signal and the phonetic transcriptions in the phonetic dictionary;

constrains the word hypotheses to a narrowed set of commands according to the conceptual meaning of the legitimate word sequences from either one or both of the recognition grammars; and provides the narrowed set of commands to a natural language processing component that translates the narrowed set of commands to a formalized set of instructions that can be processed by an application.

2. The system of claim 1, wherein the acoustic signal analyzer is configured to obtain the digital speech signal from a microphone.

3. The system of claim 1, wherein the acoustic signal analysis is configured to obtain a speech signal from a telephone.

4. The system of claim 1, further comprising a speech recognition front end that comprises the acoustic signal analyzer, the acoustic decoder, the recognition grammars, and the phonetic dictionary.

5. The system of claim 1, wherein the legitimate word sequences of either one or both of the recognition grammars comprise a set of legitimate variations.

6. The system of claim 1, wherein the legitimate word sequences comprise a total set of user commands that are expected for a context.

7. The system of claim 1, wherein either one or both of the recognition grammars comprise a recognition grammar network.

8. The system of claim 1, wherein the system comprises at least two recognition grammars.

9. The system of claim 1, wherein either one or both of the recognition grammars model interactions across different contexts.

10. The system of claim 1, wherein either one or both of the recognition grammars model interactions across different domains.

11. The system of claim 1, wherein the acoustic decoder is further configured to trigger a request for clarification from a user for a command not specified within a recognition grammar.

12. The system of claim 1, wherein the narrowed set of commands includes text commands.

13. The system of claim 1, further comprising the natural language processing component.

14. The system of claim 13, further comprising a dialog manager that receives the narrowed set of commands from the natural language processing component and generates a response.

15. The system of claim 14, further comprising a speech output back end that generates a verbal system response based on the response from the dialogue manager.

16. The system of claim 15, wherein the verbal response comprises a request for clarification.

17. The system of claim 14, wherein the dialogue manager is further configured to generate the response as an action to be performed by a device.

18. The system of claim 17, wherein the action to be performed by the device includes accessing a database.

19. The system of claim 17, wherein the action to be performed by the device includes retrieving a piece of information.

20. The system of claim 1 wherein said probabilistic phrase thesaurus contains pre-tagged descriptors for each phrase classification.

21. A non-transitory computer readable storage medium on which are stored software instructions executable by a processor to perform operations for speech recognition, the operations comprising:

generating acoustic features from a digital speech signal representing spoken input;

computing a set of most probable word hypotheses based on the acoustic features from the digital speech signal and phonetic transcriptions of the acoustic features derived from a phonetic dictionary;

constraining the word hypotheses to a narrowed set of commands according to a conceptual meaning represented by a legitimate word sequence, the legitimate word sequence specified from alternate phrase variants of a language by either one or both of a first recognition grammar based on a first language and a second recognition grammar based on a second language, the either one or both of the first and second recognition grammars being coupled to a probabilistic phrase thesaurus including a data structure of phrases classified according to at least semantic similarity; and providing the narrowed set of commands to a natural language processing component that translates the narrowed set of commands to a formalized set of instructions that can be processed by an application.

22. A method of speech recognition using at least one processor and at least one non-transitory computer readable storage medium, the method comprising:

generating acoustic features from a digital speech signal representing spoken input;

computing a set of most probable word hypotheses based on the acoustic features from the digital speech signal and phonetic transcriptions of the acoustic feature derived from a phonetic dictionary;

constraining the word hypotheses to a narrowed set of commands according to a conceptual meaning represented by a legitimate word sequence, the legitimate word sequence specified from alternate phrase variants of a language by either one or both of a first recognition grammar based on a first language and a second recognition grammar based on a second language, the either one or both of the first and second recognition grammars being coupled to a probabilistic phrase thesaurus including a data structure of phrases classified according to at least semantic similarity; and providing the narrowed set of commands to a natural language processing component that translates the narrowed set of commands to a formalized set of instructions that can be processed by an application.

* * * * *